United States Patent
Tamura et al.

(10) Patent No.: US 6,816,768 B2
(45) Date of Patent: Nov. 9, 2004

(54) CONTROLLING SCHEME FOR STAND-BY BRAKING TORQUE APPLIED TO AUTOMOTIVE VEHICLE

(75) Inventors: Minoru Tamura, Yokohama (JP); Hideaki Inoue, Yokohama (JP); Naoki Maruko, Kanagawa (JP); Takayuki Watanabe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 2 days.

(21) Appl. No.: 09/942,679

(22) Filed: Aug. 31, 2001

(65) Prior Publication Data

US 2002/0026273 A1 Feb. 28, 2002

(30) Foreign Application Priority Data

Aug. 31, 2000 (JP) .................................. 2000-263975

(51) Int. Cl.⁷ .............................. B60T 7/12; B60T 8/32; B60K 41/28
(52) U.S. Cl. ............................. 701/70; 701/93; 340/436
(58) Field of Search ............................. 701/70, 93, 96, 701/76; 340/436, 903; 180/170, 176, 179; 303/122.06, 20, 112, 167; 342/71

(56) References Cited

U.S. PATENT DOCUMENTS

| | | | | |
|---|---|---|---|---|
| 4,129,342 A | * | 12/1978 | Sato et al. .................... 303/105 |
| 5,131,268 A | * | 7/1992 | Dillmann ...................... 73/121 |
| 5,410,484 A | | 4/1995 | Kunimi et al. ......... 364/426.01 |
| 5,447,363 A | | 9/1995 | Fukamachi ................. 303/125 |
| 5,696,681 A | * | 12/1997 | Hrovat et al. .......... 364/426.01 |
| 5,727,854 A | | 3/1998 | Pueschel et al. ............ 303/155 |
| 5,752,214 A | * | 5/1998 | Minowa et al. ............. 701/111 |
| 5,765,929 A | * | 6/1998 | Hirano et al. ................ 393/112 |
| 5,797,663 A | | 8/1998 | Kawaguchi et al. ........ 303/146 |
| 6,056,374 A | * | 5/2000 | Hiwatashi .................... 303/193 |
| 6,058,347 A | * | 5/2000 | Yamamura et al. ........... 701/96 |
| 6,122,588 A | * | 9/2000 | Shehan et al. ................ 701/93 |
| 6,226,593 B1 | * | 5/2001 | Kurz et al. .................. 701/301 |

FOREIGN PATENT DOCUMENTS

| | | |
|---|---|---|
| DE | 197 44 112 C1 | 10/1998 |
| DE | 197 49 296 C1 | 7/1999 |
| DE | 199 51 423 A1 | 5/2001 |
| JP | 54040432 | 3/1979 |
| JP | 6-24302 | 2/1994 |
| JP | 7-144588 | 6/1995 |
| JP | 8-80822 | 3/1996 |
| JP | 10-59150 | 3/1998 |
| JP | 11301434 | 11/1999 |
| JP | 11-321591 | 11/1999 |
| WO | WO 99/20508 A | 4/1999 |

OTHER PUBLICATIONS

U.S. patent application Ser. No. 09/789,007, Tamura et al., filed Feb. 21, 2001.
U.S. patent application Ser. No. 09/789,012, Tamura et al., filed Feb. 21, 2001.

* cited by examiner

*Primary Examiner*—Tan Q. Nguyen
*Assistant Examiner*—Dalena Tran
(74) *Attorney, Agent, or Firm*—Foley & Lardner LLP

(57) ABSTRACT

The present invention pertains a controlling scheme for brake torque, which is applied, as a stand-by braking torque, to wheels of an automotive vehicle upon determination that operator braking action is imminent. A braking system applies brake torque in response to a brake signal The brake torque applied to the vehicle is monitored and the brake signal is modified based on the monitored brake torque to alter the brake torque.

20 Claims, 10 Drawing Sheets

CONTROLLING SCHEME FOR STAND-BY BRAKING TORQUE APPLIED TO AUTOMOTIVE VEHICLE

BACKGROUND OF THE INVENTION

The present invention relates to a method and a system for controlling a stand-by braking torque applied to an automotive vehicle under a condition of approaching or following an obstacle preceding the vehicle. The term "obstacle" is used herein to mean a stationary or moving object within the path of the vehicle, for example, vehicles, pedestrians, etc. The term "stand-by braking torque" is used herein to mean a brake torque, i.e., a negative torque, applied to a vehicle in anticipation of operator braking action or when operator braking action is imminent under a condition of approaching or following an obstacle preceding the vehicle, The term "operator braking action" is used herein to mean vehicle operator or driver action to operate a brake pedal with intention to lower traveling speed of a vehicle.

JP-A 7-144588 discloses a system whereby traveling speed and deceleration of an obstacle preceding a host vehicle are determined using a Doppler sensor and a vehicle speed sensor, which are on the vehicle, and a desired distance from the obstacle is determined. In this system, a vehicle operator is warned and an automatic braking action is initiated if the distance from the obstacle becomes less than the desired distance.

JP-A 6-24302 discloses a system whereby, when operator foot leaves an accelerator pedal, two micro switches are both closed to energize a solenoid for activating a brake pedal. Energizing the solenoid pulls the brake pedal to partially activate a braking system before operator braking action.

Other systems have been proposed that are intended to initiate braking action before operator braking action. JP-A 8-80822 discloses a system whereby, when the time rate of change of an accelerator angle upon operator releasing the accelerator pedal exceeds a predetermined level, a brake actuator is activated to partially activate a braking system before operator braking action.

JP-A 10-59150 discloses a system whereby, when the time rate of change of a throttle angle upon operator releasing an accelerator pedal exceeds a predetermined level, a support braking torque is applied to wheels of an automotive vehicle in addition to braking torque applied to the vehicle wheels corresponding to depression of a brake pedal by vehicle operator.

JP-A 11-321591 discloses a system, whereby clearance between brake pad and lining of an automotive vehicle is decreased when pressure with which an accelerator pedal is depressed is decreased or the accelerator pedal is released, thereby to shorten time and distance for vehicle operator to stop the vehicle.

In the event where brake pressure is regulated to apply stand-by braking torque, a need remains toward a control strategy for brake pressure that may be used with conventional widely prevailing brake components.

An object of the present invention is to meet the above-mentioned need by providing a method or system for controlling brake pressure, which does not rely on feedback control.

SUMMARY OF THE INVENTION

The present invention provides a method for controlling a stand-by braking torque applied to an automotive vehicle under a condition of approaching or following an obstacle preceding the vehicle, the method comprising:

determining a brake signal for brake pressure to apply a brake torque, as a stand-by braking torque;

establishing at least one brake torque threshold;

monitoring the brake torque;

comparing the monitored brake torque with the established brake torque threshold; and modifying the brake signal in response to the comparing the monitored brake torque with the established brake torque threshold.

BRIEF DESCRIPTION OF THE DRAWINGS

Further objects and advantages of the invention will be apparent from reading of the following description in conjunction with the accompanying drawings.

DESCRIPTION OF THE PREFERRED EMBODIMENTS

Figure 1:
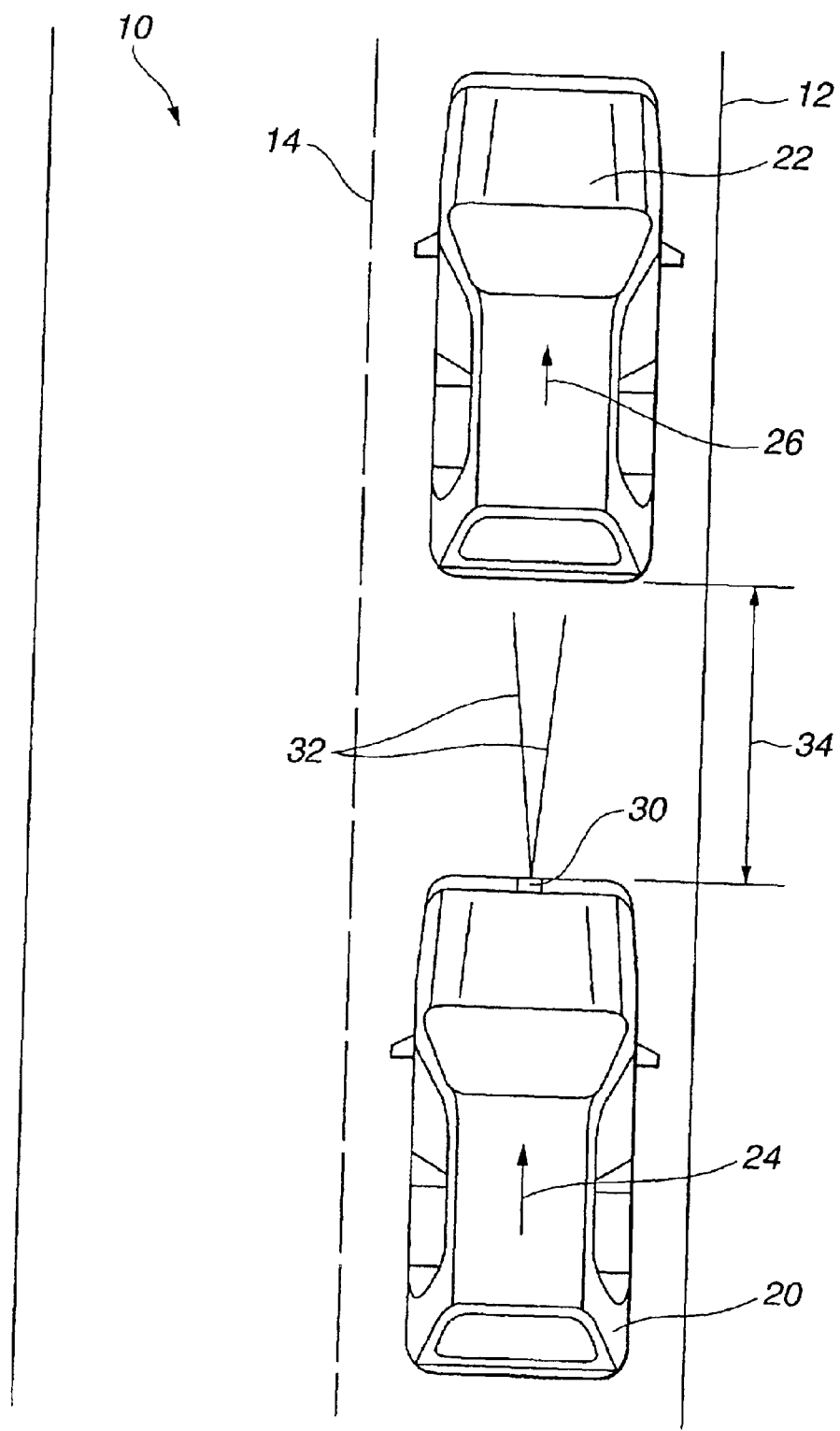
FIG. 1 is a plan view of an obstacle avoidance situation on a straightway.

FIG. 1 shows a typical situation on a straightway 10 having an edge 12 and a centerline 14, in which a fast moving automotive vehicle 20 is approaching an obstacle, in the form of a slow moving vehicle 22, from behind. Vehicle 20 is moving at a velocity in the direction of an arrow 24, and vehicle 22 at a velocity in the direction of an arrow 26. In FIG. 1, arrows 24 and 26 are vectors so that their lengths represent the magnitude of the velocities. In the front portion of vehicle 20, an obstacle detection system 30, shown schematically, scans roadway 10 within an angular field 32. In this case, vehicle 22 in front is located inside angular field 32 and vehicle 20 is spaced at a distance 34. On the basis of evaluation of the environmental data from detection system 30, vehicle 20 will recognize the illustrated situation as a situation in which there is a need for operator braking action to reduce the vehicle speed. In this situation, it is required for the vehicle operator to release the accelerator prior to braking action. In a preferred embodiment, control logic is employed to determine that operator braking action is imminent in response to a reduction in accelerator angle in the situation in which a need for operator braking action remains, and to apply stand-by braking torque upon determination that operator braking action is imminent. Application of stand-by braking torque is adapted for assist in vehicle operator braking action. In another embodiment, control logic may be employed to determine that operator braking action is imminent when speed of reduction in accelerator angle exceeds a threshold.

Figure 2:
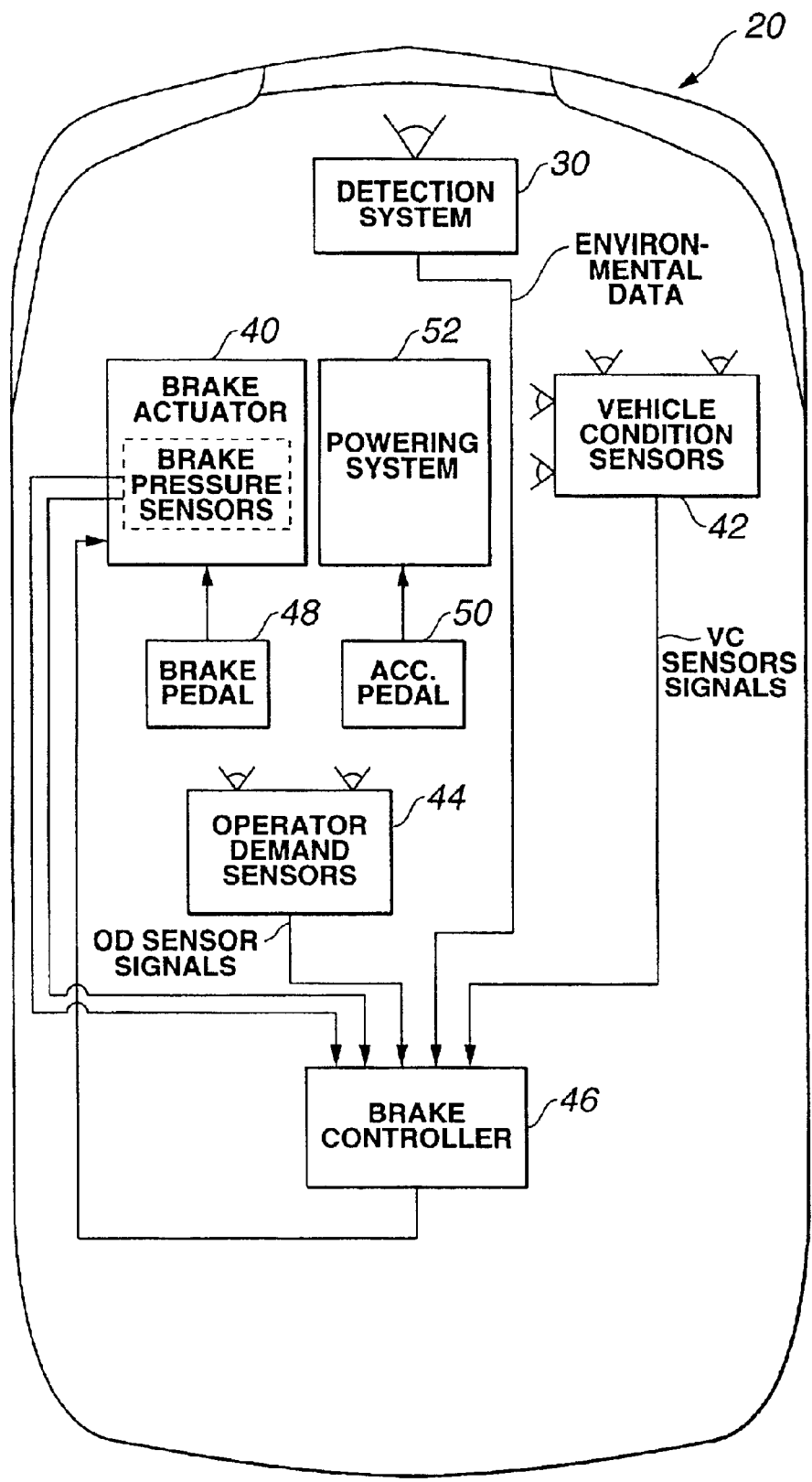
FIG. 2 is a schematic block diagram showing the arrangement of one representative implementation of a system for controlling stand-by braking torque applied to an automotive vehicle under a condition of approaching or following an obstacle preceding the vehicle.

FIG. 2 provides arrangement of one representative implementation of a system for controlling stand-by braking torque in vehicle 20. The system determines a command in the form of a brake signal for brake pressure to apply stand-by braking torque. The brake signal is applied to a brake actuator 40. For this purpose, environmental data furnished by detection system 30, vehicle condition (VC) sensors signals from vehicle condition (VC) sensors 42, and operator demand (OD) sensors signals from operator demand sensors 44 are supplied to a brake controller 46. OD sensors 44 include a sensor for detecting operator deceleration demand expressed through a brake pedal 48 and a sensor for detecting operator power demand expressed through an accelerator or accelerator pedal 50. Operator power demand is applied to a powering system 52. In the embodiment, powering system 52 is a power train including an internal combustion engine, and a transmission. The engine has various engine speeds and engine torques. The transmission has various speed ratios between an input member driven by the engine and an output member drivingly coupled with at least one of wheels of vehicle 20. In a preferred embodiment, brake actuator 40 employs hydraulic fluid, such as brake oil, as working medium.

Figure 3:
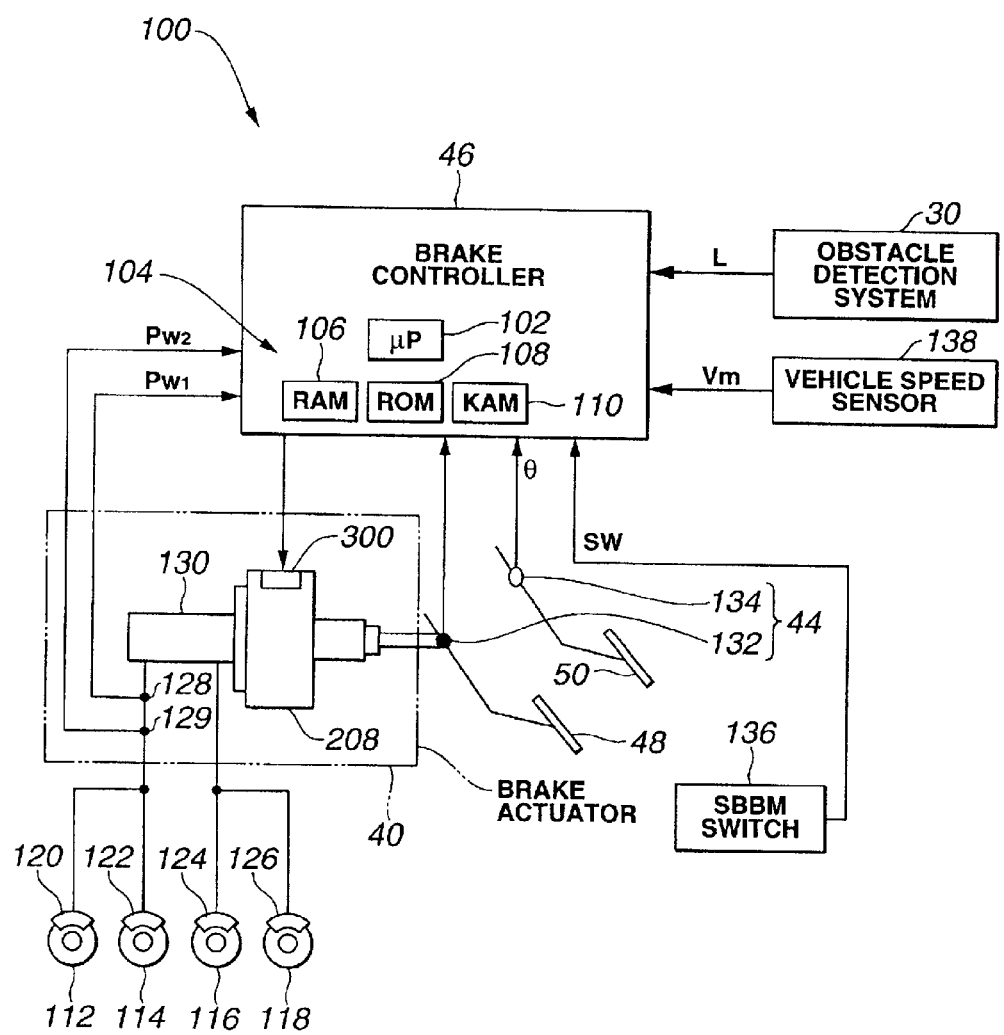
FIG. 3 is a block diagram illustrating a system and method for brake control, which provides stand-by braking torque applied to an automotive vehicle under a condition of approaching or following an obstacle preceding the vehicle.

Referring to FIG. 3, a block diagram illustrates an operation of a system or method for controlling stand-by braking torque applied to an automotive vehicle under a condition of approaching or following an obstacle preceding the vehicle. System 100 preferably includes a controller, such as brake controller 46. Brake controller 46 comprises a microprocessor-based controller associated with a microprocessor, represented by a reference numeral 102. Microprocessor 102 communicates with associated computer-readable storage medium 104. As will be appreciable by one of ordinary skill in the art, computer-readable storage medium 104 may include various devices for storing data representing instructions executable to control a braking system including brake actuator 40. For example, computer-readable storage medium 104 may include a random access memory (RAM) 106, a read-only memory (ROM) 108, and/or a keep-alive memory (KAM) 110. These functions may be carried out through any one of a number of known physical devices including EPROM, EEPROM, flash memory, and the like. The present invention is not limited to a particular type of computer-readable storage medium, examples of which are provided for convenience of description only.

Controller 46 also includes appropriate electronic circuitry, integrated circuits, and the like to effect control of the braking system. As such, controller 46 is used to effect control logic implemented in terms of software (instructions) and/or hardware components, depending upon the particular application. Details of control logic implemented by controller 46 are provided with reference to FIGS. 5–10.

Controller 46 monitors brake torque applied, as a stand-by braking torque to vehicle 20, and preferably receives inputs from brake actuator 40 indicative of present conditions of the brake actuator 40. For example, controller 46 may receive brake system pressure indicative of a hydraulic brake pressure for operating one or more braking devices, which may include any device that applies a negative torque to front wheels 112 and 114 and rear wheels 116 and 118. A braking device includes various types of friction brakes, such as disk brakes 120, 122, 124, and 126 or drum brakes. In FIG. 3, two pressure sensors, namely a first pressure sensor 128 and a second pressure sensor 129, are provided to generate brake pressure indicative output signals $P_{W1}$ and $P_{W2}$, each indicative of one hydraulic brake pressure delivered to friction brakes 120 and 122 for front wheels 112 and 114. In FIG. 3, brake actuator 40 includes a master brake cylinder 130, with a brake booster 208, and a brake pedal 48. First and second pressure sensors 128 and 129 are located to detect brake pressure within hydraulic fluid line interconnecting master brake cylinder 130 and friction brakes 120 and 122. Brake booster 208 in the embodiment will be described later in connection with FIG. 4.

Controller 46 receives inputs from operator demand sensors 44, which include a brake switch 132 and an accelerator stroke (AC) sensor 134. The setting is such that brake switch 132 is turned off upon operator releasing brake pedal 48 or turned on upon operator depressing brake pedal 48. AC sensor 134 detects angle $\theta$ of accelerator pedal 50 through measurement of its stroke. Controller 46 receives angle $\theta$ and determines operator power demand expressed through accelerator pedal 50. In the embodiment, AC sensor 134 constitutes a component of a system for determining the magnitude or degree of operator power demand.

In the embodiment shown in FIG. 3, controller 46 receives input SW from a stand-by braking mode (SBBM) switch 136, which may be manually operated or automatically operated in view of circumstances around the vehicle 20. The setting is such that controller 46 performs operation in stand-by braking mode upon selection of the mode by SBBM switch 136.

Controller 46 receives environmental data from obstacle detection system 30. In the embodiment shown in FIG. 3, obstacle detection system 30 includes a radar sensor in the form of conventional laser radar or millimeter wave (MMW) radar sensor mounted in a forward section of vehicle 20. The conventional laser radar sensor comprises such known elements as laser diodes, transmission and receiver lenses, infrared filters, and photodiodes, as is generally understood in the art to which this invention pertains. MMW radar typically comprises such known elements as an antenna, down converter, video processor, FMCW modulator and associated electronics, as is generally understood in the art to which this invention pertains. The radar sensor propagates a signal along the path of vehicle 20 and collects reflections of the signal from an obstacle in or near the path. Obstacle detection system 30 further comprises an analog-to-digital converter of any suitable conventional type for converting the radar sensor output signal to a digital form for processing in microprocessor 102 to determine a distance L between vehicle 20 and an obstacle preceding the vehicle or a range to the obstacle.

Controller 46 receives input from a vehicle speed sensor 138. Vehicle speed sensor 138 is provided to measure or detect speed of rotation of the transmission output member. The vehicle speed sensor output signal is converted to a digital form by a suitable conventional analog-to-digital converter for processing in microprocessor 102 to determine vehicle speed Vm of vehicle 20. Most current vehicles are provided with a microprocessor-based controller, such as, an engine controller or an automatic transmission controller, which processes input from a vehicle speed sensor to determine vehicle speed Vm. In such case, controller 46 may receive the determined vehicle speed from such controller.

In embodiments of the present invention, processor 102 of controller 46 effects processing input data to determine and applies a brake signal to brake booster 208.

Figure 4:
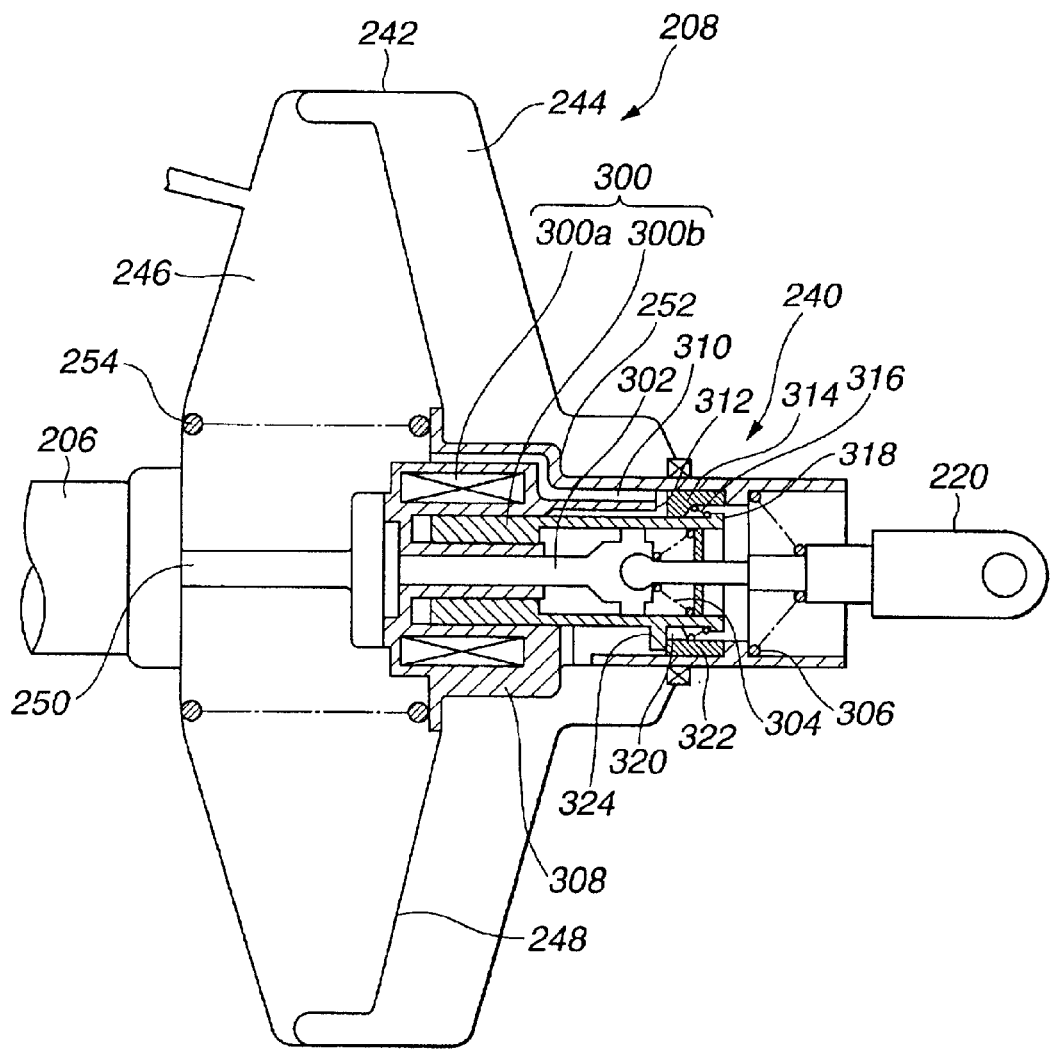
FIG. 4 is a schematic sectional view of a brake actuator.

Referring to FIG. 4, brake booster 208 includes an electro-magnetically operable control valve arrangement 240.

Controller 46 provides braking command or signal to control valve arrangement 240 for adjustment of brake pressure to accomplish a target value of stand-by braking torque. Brake booster 208 comprises an essentially rotation symmetrical housing 242, in which a rear chamber 244 and a front chamber 246 are arranged and separated from each other by a movable wall 248. Control valve arrangement 240 is coupled with movable wall 248 for a common relative movement with respect to housing 242. The front end of rod-shaped actuation member 220, which is coupled with brake pedal 48, acts on control valve arrangement 240.

Within brake booster 208, a power output member 250 is arranged which bears against control valve arrangement 240. Power output member 250 is provided for activation of master brake cylinder 130.

Control valve arrangement 240 comprises an essentially tubular valve housing 252. The front end of valve housing 252 is coupled to movable wall 248. A return spring 254 arranged within brake booster 208 resiliently biases the control valve arrangement 240 rearwardly. Within valve housing 252, an electromagnetic actuator 300 is arranged which includes a solenoid coil 300a and a plunger 300b. Arranged within plunger 300b is an operating rod 302. The front end of operating rod 302 bears against power output member 250. A return spring 304 located within plunger 300b has one end bearing against a retainer (no numeral) fixedly connected to plunger 300b and opposite end bearing against the rear end of operating rod 302. The front ball end of rod-shaped actuator 220 is fixedly inserted into socket recessed inwardly from the rear end of operating rod 302. A return spring 306 located within valve housing 308 has one end bearing against a shoulder of valve housing 308 and opposite end bearing against a shoulder of rod-shaped actuator 220.

Valve housing 308 is formed with a passage 310 through which fluid communication between rear and front chambers 244 and 246 is established. The front end of passage 310 is always open to front chamber 246, while the rear end of passage 310 is located within a valve seat 312. Valve seat 312 is located within an annular space defined between plunger 300b and valve housing 308 and faces a valve member 314 that forms an upper portion of a slide. The slide is located between plunger 300b and valve housing 308. A return spring 316 has one end bearing against an integral abutment 318 of plunger 300b and opposite end bearing against the slide. An air admission port 320 is formed through a lower portion of the slide. This lower portion of the slide serves as a valve seat 322. Port 320 is provided to admit ambient air into rear chamber 244. Valve seat 322 formed with port 320 faces a valve member 324 integral with plunger 300b. Valve seat 312 and valve member 314 cooperate with each other to form an interruption or vacuum valve. Valve seat 322 and valve member 324 cooperate with each other to form an ambient air admission valve.

In the rest position shown in FIG. 4 with the vacuum source disconnected, atmospheric pressure prevails in both chambers 244 and 246. With the vacuum source connected, i.e., with the engine running, a vacuum builds up in front chamber 246 so that movable wall 248 together with the control valve arrangement 240 is slightly displaced in a forward direction. Accordingly, a new pressure balance is achieved between two chambers 244 and 246. From this position, a lost travel free activation of the brake booster 208 is ensured.

Under a normal brake actuation by the vehicle operator, the brake booster 208 operates in a usual manner by interrupting the connection between two chambers 244 and 246 via the interruption valve (312, 314) and admitting ambient air into rear chamber 244 via the ambient air admission valve (324, 322).

Electromagnetic actuator 300 can actuate control valve arrangement 240. For this purpose, current through solenoid 300a is regulated in response to the command furnished by brake controller 46. This command causes a displacement of control valve arrangement 240 so that ambient air can flow into rear chamber 244.

Figure 5:
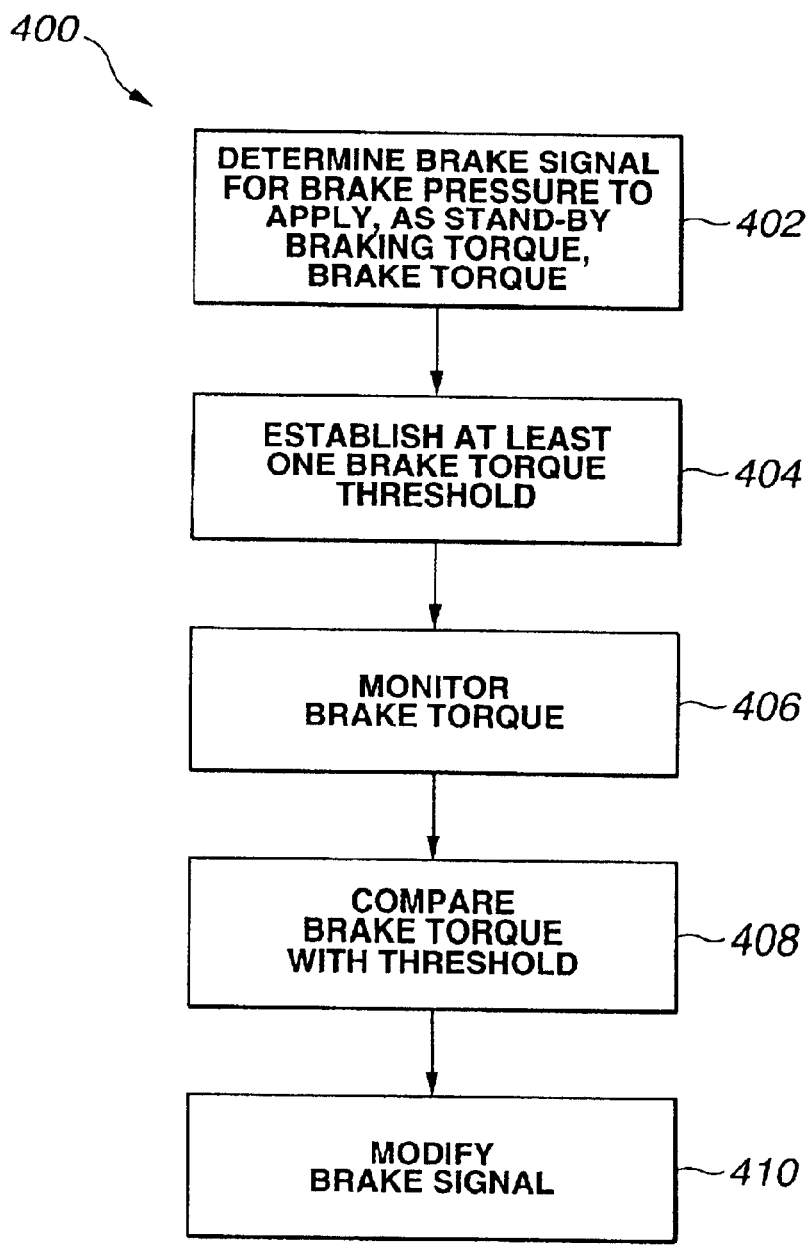
FIG. 5 is a block diagram illustrating a method of the present invention for controlling stand-by brake pressure.

With reference to FIG. 5, a method of the present invention for controlling a stand-by braking torque is generally indicated at 400. At block 402, a brake signal for brake pressure to apply a brake torque, as a stand-by braking torque, is determined. At block 404, at least one brake torque threshold is established. At block 406, the applied brake torque is monitored. At block 408, the monitored brake torque is compared with the established brake torque threshold. At block 410, the brake signal is modified in response to the comparing the monitored brake torque with the established brake torque threshold, In a preferred embodiment of this invention, a braking system is employed, which uses hydraulic brake fluid as working medium. In such a case, operations for monitoring the brake torque include pressure detections, by sensors 128 and 129, for example. Pressure of the hydraulic brake fluid is detected at a first location within the braking system to generate a first output signal $P_{W1}$ indicative of the detected pressure. Pressure of the hydraulic brake fluid is detected at a second location within the braking system to generate a second output signal $P_{W2}$ indicative of the detected pressure. The first and second output signals ($P_{W1}$, $P_{W2}$) are processed to provide at least one variable ($P_{Hi}$, $P_{Lo}$, $\Delta P_{MAX}$, $\Delta P_{MIN}$) expressing one of characteristics of the brake torque. Instantaneous magnitude of the brake torque, and time rate of change of magnitude of the brake torque are examples of the characteristics of the brake torque.

In a first preferred embodiment of the present invention, the first and second output signals ($P_{W1}$, $P_{W2}$) are processed to select a higher one of the first and second output signals ($P_{W1}$, $P_{W2}$) as the variable ($P_{Hi}$), which expresses the instantaneous magnitude of the brake torque. In a second preferred embodiment of the present invention, a lower one of the first and second output signals ($P_{W1}$, $P_{W2}$) is selected as the variable ($P_{Lo}$), which expresses the instantaneous magnitude of the brake torque.

In a third preferred embodiment of the present invention, a higher one of the first and second output signals ($P_{W1}$, $P_{W2}$) is selected to determine a first value of the variable ($P_{Hi}$), and a lower one of the first and second output signals ($P_{W1}$, $P_{W2}$) is selected to determine a second value of the variable ($P_{Lo}$). The first and second values represent the variable, which expresses the instantaneous magnitude of the brake torque. Ideally, the first and second output signals ($P_{W1}$, $P_{W2}$) are the same and the first and second values are equal to each other. Under the real conditions, the first and second output signals ($P_{W1}$, $P_{W2}$) are subject to variation even if the first and second detection locations are the same.

In a fourth embodiment of the present invention, the first and second values ($P_{Hi}$, $P_{Lo}$) of the variable, which are determined in a current processor operating cycle, are sampled as current sampled first and second values ($P_{Hi(n)}$, $P_{Lo(n)}$), respectively. The previously determined first and second values of the variable, which were determined in the preceding operating cycle, are sampled as old sampled first and second values ($P_{Hi(n-1)}$, $P_{Lo(n-1)}$), respectively. A first time rate of change $\Delta P_1$ is calculated, which is expressed as a ratio of [a difference between the current sampled first value $P_{Hi(n)}$ and the old sampled second value $P_{Lo(n-1)}$] to [a cycle time $\Delta T$]. A second time rate of change $\Delta P_2$ is calculated, which is expressed as a ratio of [a difference between the current sampled first value $P_{Hi(n)}$ and the old sampled first value $P_{Hi(n-1)}$] to [the cycle time $\Delta T$]. A third time rate of change $\Delta P_3$ is calculated, which is expressed as a ratio of [a difference between the current sampled second value $P_{Lo(N)}$ and the old sampled second value $P_{Lo(n-1)}$] to [the cycle time $\Delta T$]. A fourth time rate of change $\Delta P_4$ is calculated, which is expressed as a ratio of [a difference between the current sampled second value $P_{Lo(n)}$ and the old sampled first value $P_{Hi(n-1)}$] to [the cycle time $\Delta T$]. The maximum value $\Delta P_{MAX}$ and the minimum value $\Delta P_{MAX}$ are selected among the first, second, third, and fourth time rates of change ($\Delta P_1$, $\Delta P_2$, $\Delta P_3$, $\Delta P_4$). In each of the embodiments, the cycle time $\Delta T$ is 10 milliseconds.

According to the first embodiment, the established brake torque threshold $P_{HiO}$ indicates a brake pressure value as high as 0.3 MPa. The setting of this brake pressure value is such that vehicle longitudinal deceleration, due to brake torque caused by delivering this brake pressure over a period of time, for example, 100 milliseconds, to the friction brakes (120, 122, 124, 126), falls in a window lying below a limit beyond which vehicle longitudinal deceleration is not acceptable by the vehicle operator. In the first embodiment, the variable $P_{Hi}$, which has been given by selecting the higher one of the first and second output signals ($P_{W1}$, $P_{W2}$), is compared with threshold $P_{HiO}$. Processor operations to perform this comparison include increasing content of a counter ($CNT_{Hi}$) if variable $P_{Hi}$ is greater than or equal to threshold $P_{HiO}$, and determining whether or not the content of counter ($CNT_{Hi}$) is greater than or equal to a predetermined number ($CNT_{HiO}$). In the first embodiment, the processor operation cycle time $\Delta T$ is 10 milliseconds, so that the predetermined number ($CNT_{HiO}$) is ten (10) to represent a preferred period of time of 100 milliseconds. Upon determination that the content of the counter ($CNT_{Hi}$) is greater than or equal to the predetermined number ($CNT_{HiO}$), the brake signal $P_{PB}$ is reduced toward zero.

According to the second embodiment, the established brake torque threshold $P_{LoO}$ indicates a brake pressure value as high as 0.01 MPa. The setting of this brake pressure value is such that system performance obtained by brake torque caused by delivering this brake pressure over a period of time, for example, 100 milliseconds, to the friction brakes (120, 122, 124, 126), is slightly above a limit level below which the intended performance of the system drops considerably. In the second embodiment, the variable $P_{Lo}$, which has been given by selecting the lower one of the first and second output signals ($P_{W1}$, $P_{W2}$), is compared with threshold $P_{LoO}$. Processor operations to perform this comparison include increasing content of a counter ($CNT_{Lo}$) if variable $P_{Lo}$ is greater than or equal to threshold $P_{LoO}$, and determining whether or not the content of counter ($CNT_{Lo}$) is greater than or equal to a predetermined number ($CNT_{LoO}$). In the second embodiment, the processor operation cycle time $\Delta T$ is 10 milliseconds, so that the predetermined number ($CNT_{LoO}$) is ten (10) to represent a preferred period of time of 100 milliseconds. Upon determination that the content of the counter ($CNT_{Lo}$) is greater than or equal to the predetermined number ($CNT_{LoO}$), the brake signal $P_{PB}$ is increased toward a predetermined maximum value ($P_{PBMAX}$). In the second embodiment, the predetermined maximum value $P_{PBMAX}$) indicates a brake pressure value as high as 0.2 MPa.

Figure 9:
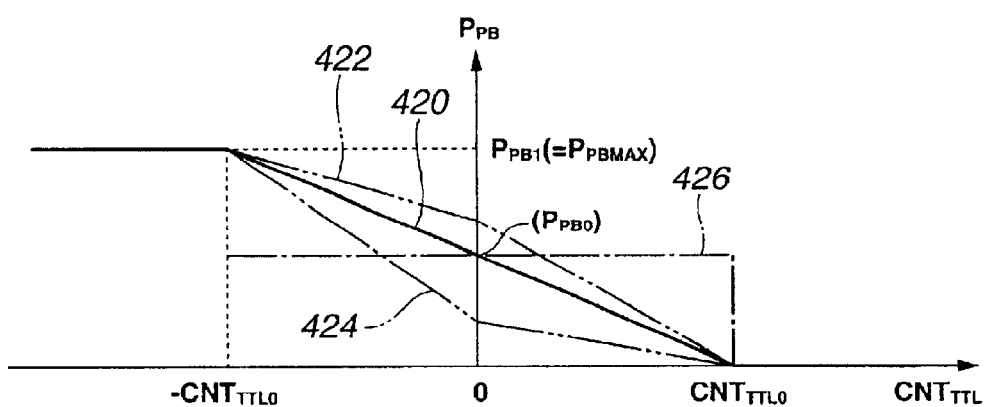
FIG. 9 is a graphical representation of a relationship between a brake signal ($P_{PB}$) and a difference indicative counter ($CNT_{TTL}$).

According to the third embodiment, two brake torque thresholds, namely, a first brake torque threshold $P_{HiO}$ and a second brake torque threshold $P_{LoO}$, are provided. In this embodiment, the first and second thresholds ($P_{HiO}$, $P_{LoO}$) indicate a brake pressure value as high as 0.3 MPa and a brake pressure value as high as 0.01 MPa, respectively. The setting of these brake pressures is derived from the same reasons explained above in connection with the first and second embodiments. In the third embodiment, the first and second values of the variable ($P_{Hi}$, $P_{Lo}$), which have been determined due to selection of a higher one and a lower one of the first and second output signals ($P_{W1}$, $P_{W2}$), are compared with the first and second thresholds ($P_{HiO}$, $P_{LoO}$), respectively. Processor operations to perform this comparison include increasing content of a down counter ($CNT_{DN}$) if the first value of the variable $P_{Hi}$ is greater than or equal to the first threshold $P_{HiO}$, and increasing content of an up-counter ($CNT_{up}$) if the second value of the variable $P_{Lo}$ is less than or equal to the second threshold $P_{LoO}$. Content of a total counter ($CNT_{TTL}$) is calculated by subtracting the content of the up-counter ($CNT_{up}$) from the content of the down-counter ($CNT_{DN}$). In the third embodiment, the content of the total counter ($CNT_{TTL}$) is used to modify the brake signal $P_{PB}$. With reference to FIG. 9, the fully drawn line 420 illustrates one pattern of variation of the brake signal $P_{PB}$ against the content of total counter ($CNT_{TTL}$). In FIG. 9, the vertical axis represents $P_{PB}$, while the horizontal axis represents $CNT_{TTL}$. The reference character $P_{PB0}$, which indicates a point at which the fully drawn line 420 intersects the vertical axis, represents an initial value of brake signal $P_{PB}$ and indicates, in this embodiment, a brake pressure value as high as 0.1 MPa. In the third embodiment, the processor operation cycle time $\Delta T$ is 10 milliseconds, so that the reference character $CNT_{TTLO}$ indicates a predetermined number of ten (10) to represent a preferred period of time of 100 milliseconds. Similarly, the reference character $-CNT_{TTLO}$ indicates a predetermined number of ten (10) to represent a preferred period of time of 100 milliseconds. The reference character $P_{PBMAX}$ indicates a predetermined maximum value of brake pressure as high as 0.2 MPa. In the third embodiment, the brake signal $P_{PB}$ stays as great as the initial value $P_{PB0}$ when the content of total counter ($CNT_{TTL}$) is zero. In the event the content of total counter ($CNT_{TTL}$) is greater than zero, the brake signal $P_{PB}$ is decreased toward zero as the content of the total counter ($CNT_{TTL}$) increases. In the event the content of total counter ($CNT_{TTL}$) is less than zero, the brake signal $P_{PB}$ is increased toward the predetermined maximum value $P_{PBMAX}$ as the content of the total counter ($CNT_{TTL}$). As illustrated by the fully drawn line 420, the brake signal $P_{PB}$ is equal to $P_{PBMAX}$ if $CNT_{TTL}$ is equal to or less than $-CNT_{TTLO}$, and the brake signal $P_{PB}$ is equal to zero if $CNT_{TTL}$ is equal to or greater than $CNT_{TTLO}$. The fully drawn line 420 of FIG. 9 illustrates one example of various patterns of variation of the brake signal $P_{PB}$ versus $CNT_{TTL}$, only. The present invention is not limited to this example. In FIG. 9, two-dot chain lines 422 and 424 illustrate other examples wherein the initial value $P_{PB0}$ is different from 0.1 MPa. In FIG. 9, one-dot chain line 426 illustrates still other example wherein the features of the first and second embodiments are implemented. Describing specifically along with the one-dot chain line 426 in FIG. 9, the brake signal $P_{PB}$ is held as high as the initial value $P_{PB0}$ if the content of total counter $CNT_{TTL}$ is greater than $-CNT_{TTLO}$ or less than $CNT_{TTLO}$, while the brake signal $P_{PB}$ is set equal to zero if the content of total counter $CNT_{TTL}$ is equal to $CNT_{TTLO}$ or it is set equal to $P_{PBMAX}$ if $CNT_{TTL}$ is equal to $-CNT_{TTLO}$. In this case, if desired, the brake signal $P_{PB}$ may be gradually increased toward $P_{PBMAX}$ as illustrated by the fully drawn line 420 as the content of total counter $CNT_{TTL}$ decreases from zero toward $-CNT_{TTLO}$.

According to the fourth embodiment, two brake torque thresholds, namely, a first brake torque threshold $\Delta P_{MAXO}$ and a second brake torque threshold $\Delta P_{MINO}$ are provided. In this embodiment, the first threshold $\Delta P_{MAXO}$ indicates a time rate of change in brake pressure as great as the maximum of various time rates of change in brake pressure available during operator operation of a brake pedal in normal braking. The second threshold $\Delta P_{MINO}$ indicates a time rate of change in brake pressure as great as a time rate of change in brake pressure, below which the intended performance of the system drops considerably. In the fourth embodiment, the first and second values of the variable ($\Delta P_{MAX}$, $\Delta P_{MIN}$), which have been determined due to selection of the maximum and the minimum among the first, second, third, and fourth time rates of change ($\Delta P_1$, $\Delta P_2$, $\Delta P_3$, $\Delta P_4$) are compared with the first and second thresholds ($\Delta P_{MAXO}$, $\Delta P_{MINO}$). The brake signal $P_{PB}$ is decreased to zero if the first value of the variable $\Delta P_{MAX}$ is greater than or equal to the first threshold $\Delta P_{MAXO}$. The brake signal $P_{PB}$ is increased toward a predetermined maximum value $P_{PBMAX}$ by a predetermined amount $\Delta P_{PB0}$ if the second value of the variable $\Delta P_{MIN}$ is less than or equal to the second threshold $\Delta P_{MINO}$. In the fourth embodiment, the predetermined maximum value $P_{PBMAX}$ indicates a brake pressure value as high as 0.2 MPa.

In each of the first to fourth embodiments, the brake signal $P_{PB}$ initially corresponds to the initial value $P_{PB0}$ upon determination that vehicle operator braking action is imminent.

This initial value $P_{PB0}$ is fixed in the embodiments for illustration purpose only. The present invention is not limited to the use of such fixed initial value $P_{PB0}$. The initial value $P_{PB0}$ may be subject to variation to cope with various vehicle and/or environmental conditions when operator braking action is imminent.

With reference to FIG. 3, a series of operations are stored in computer readable storage medium 104 in the form of sequences of instructions implemented in software for determining a brake signal for brake pressure to apply a brake torque, as a stand-by braking torque, establishing at least one brake torque threshold, monitoring the brake torque, comparing the monitored brake torque with the established brake torque threshold, and modifying the brake signal in response to the comparison.

Figure 6:
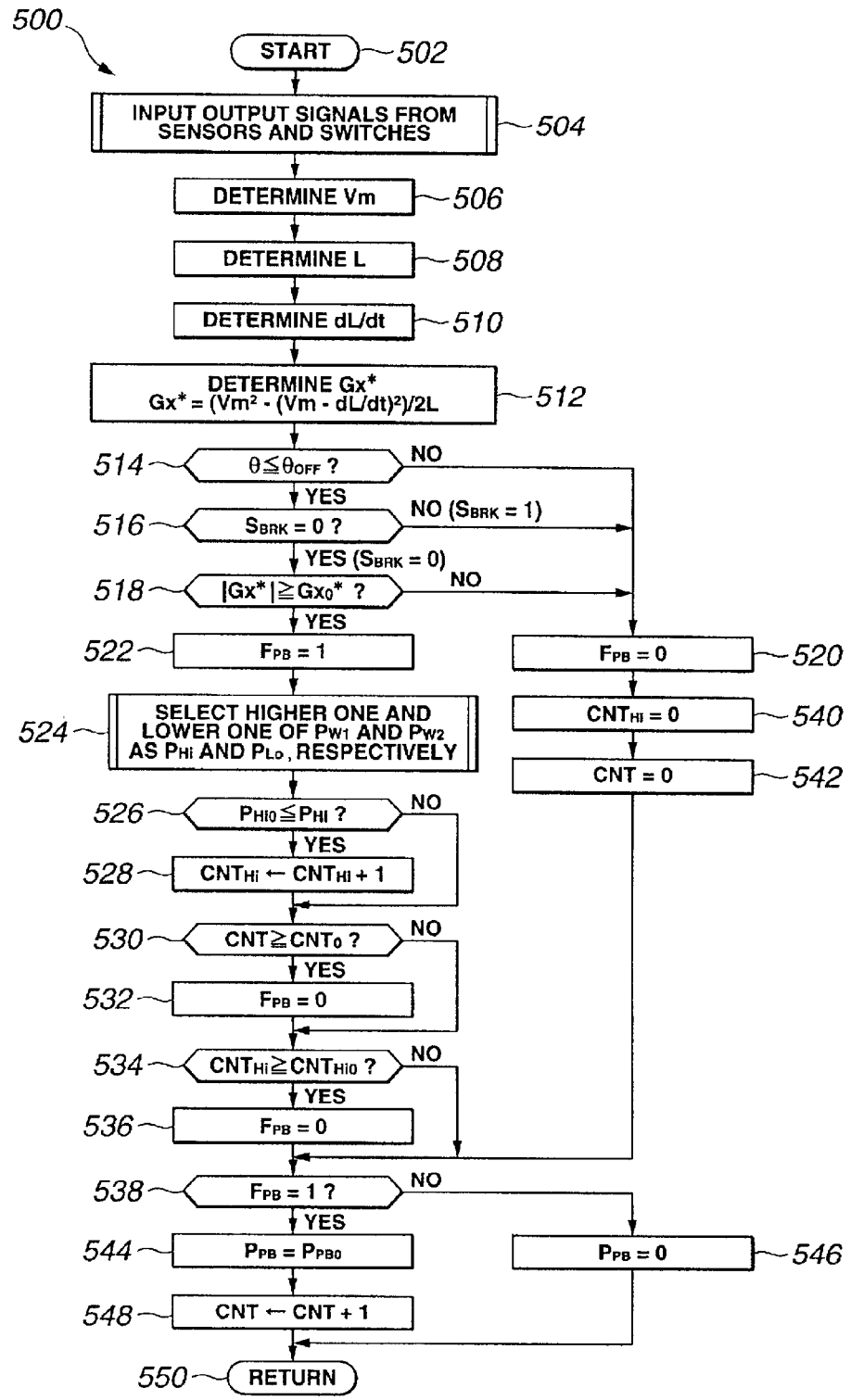
FIG. 6 is a flowchart illustrating a series of operations of a control routine for carrying out one preferred embodiment of the present invention.

FIG. 6 illustrates a series of operations for carrying out the first preferred embodiment of the present invention. The process steps of FIG. 6 are periodically executed in brake controller 46 when stand-by braking mode is selected by SMMB switch 136 (see FIG. 3) after the ignition has been on and electric power has been applied to controller 46.

In FIG. 6, a control routine is generally indicated at 500. The process steps of control routine 500 are carried out every $\Delta T$ (for example, 10 milliseconds) in controller 46 as provided through a standard computer timer-based interrupt process.

Each sequential execution of the microprocessor operations of FIG. 6 begins at start block 502 and proceeds to process block 504. At block 404, the processor receives output signals from sensors, including pressure sensors (128, 129), AC sensor 134 and vehicle speed sensor 138, from switches, including brake switch 132, SBBM switch 136, and from systems, including obstacle detection system 30. At block 506, the processor determines a value of traveling speed or vehicle speed Vm of vehicle 20 (see FIG. 2). At block 508, the processor determines a value of distance L between vehicle 20 and the preceding obstacle 22 based on the information received from obstacle detection system 30. At block 510, the processor calculates the time rate of change in distance dL/dt (relative speed between vehicle 20 and the preceding obstacle 22).

At the next block 512, the processor calculates a target value of deceleration $G_x^*$, which is expressed as:

$$G_x^* = \{Vm^2 - (Vm - dL/dt)^2\}/2L \qquad (2),$$

where: Vm represents the determined value of vehicle speed; and

L represents the determined value of distance between a vehicle and an obstacle preceding the vehicle.

The process then goes to block 514. At block 514, accelerator angle θ is compared with a predetermined angle $\theta_{OFF}$ for determination whether or not accelerator pedal 50 is released. In query at block 514, if θ is less than or equal to $\theta_{OFF}$ (answer "YES") indicating the state where accelerator pedal 50 is released, the process goes to block 516. At block 516, a brake switch output $S_{BRK}$ from brake switch 132 is checked. In query at block 516, if brake switch output $S_{BRK}$ is equal to "0" (answer "YES") indicating the state where brake pedal 48 is released, the process goes to block 518. At block 518, the absolute value of $G_x^*$ is compared with a predetermined value $G_{X0}^*$. In query at block 518, if the absolute value of $G_x^*$ is less than $G_{X0}^*$ (answer "NO"), the process goes to block 520. In query at block 518, if the absolute value of $G_x^*$ is greater than or equal to $G_{X0}^*$ (answer "YES"), the process goes to block 522. At block 520, he processor resets a stand-by braking in-progress flag $F_{PB}$. At block 522, the processor sets this flag $F_{PB}$. The status of flag $F_{PB}$ is periodically checked (at block 538) to find whether brake signal $P_{PB}$ is set higher than zero (at block 544) or it is set equal to zero (at block 546). Flatly speaking, it is when flag $F_{PB}$ is set that brake torque is applied, as stand-by braking torque, while it is when flag $F_{PB}$ is reset that no brake torque is applied, as stand-by braking torque.

In query at block 514, if θ is less than or equal to $\theta_{OFF}$ (answer "NO") indicating the state where accelerator pedal 50 is depressed, the process goes to block 520. In query at block 516, if brake switch output $S_{BRK}$ is equal to "1" (answer "NO") indicating the state where brake pedal 48 is depressed, the process goes to block 520. In query at block 518, if the absolute value of $G_x^*$ is less than $G_{X0}^*$ (answer "NO"), the process goes to block 520. The three enquires at three blocks 514, 516 and 518 constitute control logic for a shift of the status of flag $F_{PB}$ from "0" to "1" and a reverse shift from "1" to "0".

From the preceding description of the control routine 500, it is to be appreciated that the processor determines that operator braking action in imminent, using the control logic constituted by blocks 514, 516, and 518, and sets or keeps setting flag $F_{PB}$ ($F_{PB}=1$). Of course, any number of different control logics may be used. Control logic including image processing of CCD camera situated as high as operator eyes level is an example of such different control logics.

With continuing reference to FIG. 6, the process goes from block 522 to block 524. At block 524, the processor selects a higher one and a lower one of first and second output signals $P_{W1}$ and $P_{W2}$ from pressure sensors 128 and 129, and stores the selected higher and lower ones as a higher value $P_{Hi}$ and a lower value $P_{Lo}$ of a variable, respectively. This variable expresses, as one of characteristics of brake torque, instantaneous magnitude of the brake torque. The process then goes to block 526.

At block 526, the higher value $P_{Hi}$ of the variable is compared with a brake torque threshold $P_{HiO}$ that indicates a brake pressure value as high as 0.3 MPa. In query at block 526, if variable $P_{Hi}$ is greater than or equal to threshold $P_{HiO}$ (answer "YES"), the process goes to block 528. In query at block 526, if $P_{Hi}$ is less than $P_{HiO}$ (answer "NO"), the process skips to block 530.

At block 528, the processor performs an increment of counter $CNT_{Hi}$ by increasing content of counter $CNT_{Hi}$ by 1 (one). The processor next goes to block 530. At block 530, the content of a stand-by braking manager counter CNT is compared with a predetermined time threshold $CNT_O$. The time threshold $CNT_0$ is a predetermined number of one hundred (100) to represent a period of time of one second, that is 1000 milliseconds, because one cycle time $\Delta T$ is 10 milliseconds. In query at block 530, if the content of counter CNT is greater than or equal to time threshold $CNT_0$ (answer "YES"), the process goes to block 532. In query at block 530, if CNT is less than $CNT_0$ (answer "NO"), the process skips to block 534. At block 532, the processor resets flag $F_{PB}$. The process goes next to block 534.

At block 534, the content of counter $CNT_{Hi}$ is compared with a predetermined number $CNT_{HiO}$. The predetermined number $CNT_{HiO}$ is ten (10) to represent 100 milliseconds. In query at block 534, if content of counter $CNT_{Hi}$ is greater than or equal to $CNT_{HiO}$ (answer "YES"), the process goes to block 536.

In query at block 534, if $CNT_{Hi}$ is less than $CNT_{HiO}$ (answer "NO"), the process skips to block 538. At block 536, the processor resets flag $F_{PB}$. The process goes next to block 538.

After block 520, the process goes to blocks 540 and 542, and then to block 538. At block 540, the processor resets counter $CNT_{Hi}$. At block 542, the processor resets counter CNT.

At block 538, the flag $F_{PB}$ is checked. In query at block 538, if flag $F_{PB}$ is set, indicating that operator braking action is imminent, the process goes to block 544. In query at block 538, if flag $F_{PB}$ is reset, the process goes to block 546. At block 544, brake signal $P_{PB}$ is set to correspond to an initial value $P_{PB0}$ that is as high as 0.1 MPa, in this embodiment. The process goes to next block 548. At block 548, the processor performs an increment of counter CNT by increasing content of counter CNT by 1 (one). The process goes to return block 550. At block 546, brake signal $P_{PB}$ is set to correspond to zero pressure value. The processor skips to return block 550.

In the first embodiment, the query at block 518 is utilized as an analysis to determine whether there is a need for operator braking action to avoid a potential problem to the vehicle posed by an obstacle preceding the vehicle. In addition to the analysis at block 518 that concludes that the obstacle preceding the vehicle poses a potential problem to the vehicle, the microprocessor operations at blocks 514 and 516 are carried out to determine whether operator braking action is imminent to avoid the potential problem. At block 514, further analysis utilizes accelerator angle θ as operator power demand information. Alternatively, in the place of accelerator angel θ, a throttle position or a pulse width of fuel injection pulse may be utilized. In block 422, a stand-by braking in-progress flag $F_{PB}$ is checked. Upon determination that operator braking action is imminent, the processor sets flag $F_{PB}$ at block 522.

In query at block 514, if accelerator pedal 50 is not released, the processor resets flag $F_{PB}$ at block 520. In query at block 516, if brake pedal 48 is depressed, the processor resets flag $F_{PB}$ at block 520. In query at block 518, if the absolute value of $G_X^*$ is less than $G_{X0}^*$, the processor resets flag $F_{PB}$ at block 520. After block 520, the processor resets counters $CNT_{Hi}$ and CNT at blocks 540 and 542, respectively.

If flag $F_{PB}$ is set, the process goes from block 538 to block 544 where brake signal $P_{PB}$ corresponding to $P_{PB0}$ is applied to electromagnetic actuator 300 of brake booster 208, applying brake torque corresponding to brake pressure $P_{PB0}$ as stand-by braking torque. If flag $F_{PB}$ is reset, the process goes from block 538 to block 546 where brake signal $P_{PB}$ is set equal to zero, applying no brake torque as stand-by braking torque.

According to the first embodiment, at block 524, the first and second output signals ($P_{W1}$, $P_{W2}$) are processed to select a higher one of the first and second output signals ($P_{W1}$, $P_{W2}$) as the variable $P_{Hi}$, which expresses the instantaneous magnitude of the brake torque. If, in query at block 526, the variable $P_{Hi}$ is greater than or equal to threshold $P_{HiO}$, increment of counter $CNT_{Hi}$, is performed at block 528. If content of counter $CNT_{Hi}$ reaches $CNT_{HiO}$ (100 milliseconds) at block 530, flag $F_{PB}$ is rest at block 532. Thus, the process goes from block 538 to block 546 where brake signal $P_{PB}$ is reduced toward zero.

It will be appreciated that deceleration due to excessively great brake torque is effectively suppressed before being perceived by vehicle operator as unacceptable.

According to the first embodiment, in query at block 530, if content of counter CNT reaches $CNT_0$ (1 second), flag $F_{PB}$ is reset at block 532. In the case, too, the process goes from block 538 to block 546 where brake signal $P_{PB}$ is reduced toward zero.

Figure 7:
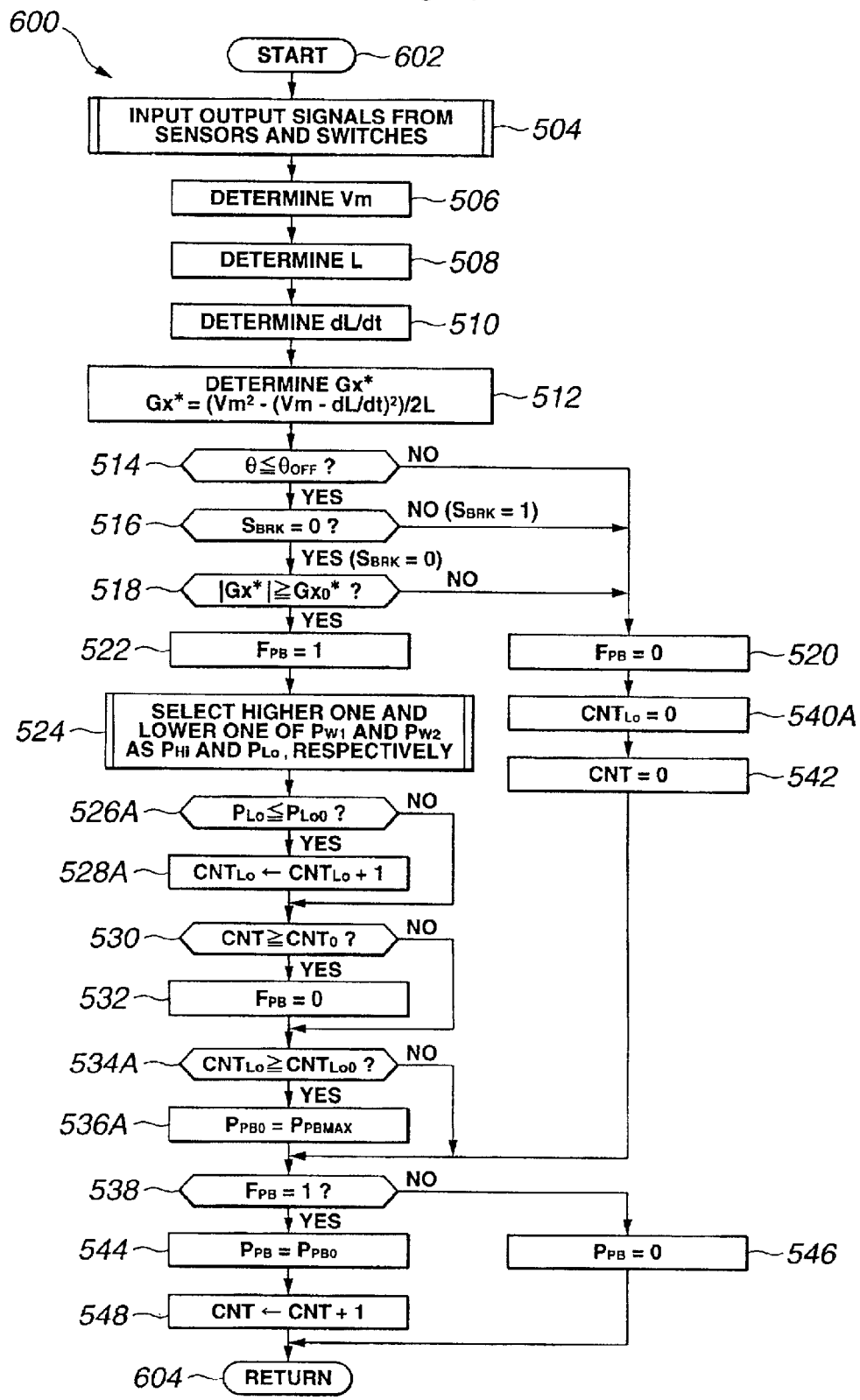
FIG. 7 is a flowchart illustrating a series of operations of a control routine for carrying out another preferred embodiment of the present invention.

FIG. 7 illustrates a series of operations for carrying out the second preferred embodiment of the present invention. In FIG. 7, a control routine is generally indicated at 600. The process steps of control routine 600 are carried out every 10 milliseconds in controller 46 as provided through a standard computer timer-based interrupt process.

Each sequential execution of the microprocessor operations of FIG. 7 begins at start block 602 and proceeds to block 504. Control routine 600 of FIG. 7 is substantially the same as control routine 500 of FIG. 6 except the provision of blocks 704, 706, 708, and 710 instead of the blocks 526 and 528, and the provision of block 712 instead of the blocks 534 and 536, and the provision of block 720 instead of the block 544, and the provision of blocks 714, 716, and 718 instead of the blocks 540 and 542. Thus like reference numerals are used throughout FIGS. 6 and 8 to indicate like blocks.

At block 526A, the lower value $P_{Lo}$ of the variable is compared with a brake torque threshold $P_{LoO}$ that indicates a brake pressure value as high as 0.01 MPa. In query at block 526A, if variable $P_{Lo}$ is less than or equal to threshold $P_{LoO}$ (answer "YES"), the process goes to block 528A. In query at block 526A, if $P_{Lo}$ is greater than $P_{LoO}$ (answer "NO"), the process skips to block 530. At block 528A, the processor performs an increment of a counter $CNT_{Lo}$ by increasing content of counter $CNT_{Lo}$ by 1 (one).

After microprocessor processing at blocks 530 and 532, the process goes to block 534A. At block 534A, the content of counter $CNT_{Lo}$ is compared with a predetermined number $CNT_{LoO}$. The predetermined number $CNT_{LoO}$ is ten (10) to represent 100 milliseconds. In query at block 534A, if content of counter $CNT_{Lo}$ is greater than or equal to $CNT_{LoO}$ (answer "YES"), the process goes to block 536A. In query at block 534A, if $CNT_{Hi}$ is less than $CNT_{HiO}$ (answer "NO"), the process skips to block 538. At block 536A, the processor sets a predetermined maximum value $P_{PBMAX}$ as an initial value $P_{PB0}$. The process goes next to block 538. The processor resets counter $CNT_{Lo}$ at block 540A after block 520. Then, the process goes to block 538. At block 538, flag $F_{PB}$ is checked. In query at block 538, if flag $F_{PB}$ is set (answer "YES"), indicating that operator braking action is imminent, the process goes to block 544. In query at block 538, if flag $F_{PB}$ is reset (answer "NO"), the process goes to block 546. At block 544, brake signal $P_{PB}$ is set to correspond to initial value $P_{PB0}$. This initial value is as high as 0.1 MPa, in this embodiment, if $CNT_{Lo}$ stays less than $CNT_{LoO}$, but becomes as high as $P_{PBMAX}$ (=0.2 MPa, in the embodiment) if $CNT_{Lo}$ reaches $CNT_{LoO}$. The process goes to next block 548. At block 548, the processor performs an increment of counter CNT by increasing content of counter CNT by 1 (one). The process goes to return block 604. At block 546, brake signal $P_{PB}$ is set to correspond to zero pressure value. The process skips to return block 604.

According to the second embodiment, counter $CNT_{Lo}$ is increased if variable $P_{Lo}$ is less than or equal to $P_{LoO}$ (see blocks 526A and 528A). If counter $CNT_{Lo}$ reaches $CNT_{LoO}$, the value $P_{PB0}$ corresponds to $P_{PBMAX}$ and thus brake signal $P_{PB}$ corresponds to $P_{PBMAX}$ (see blocks 534A, 536A, 538, and 544). Thus, if the state where $P_{Lo}$ is less than or equal to $P_{LoO}$ continues for 100 milliseconds, brake pressure is increased to a level as high as 0.2 MPa. In this manner, the intended system performance of supporting operator braking action is maintained.

Figure 8:
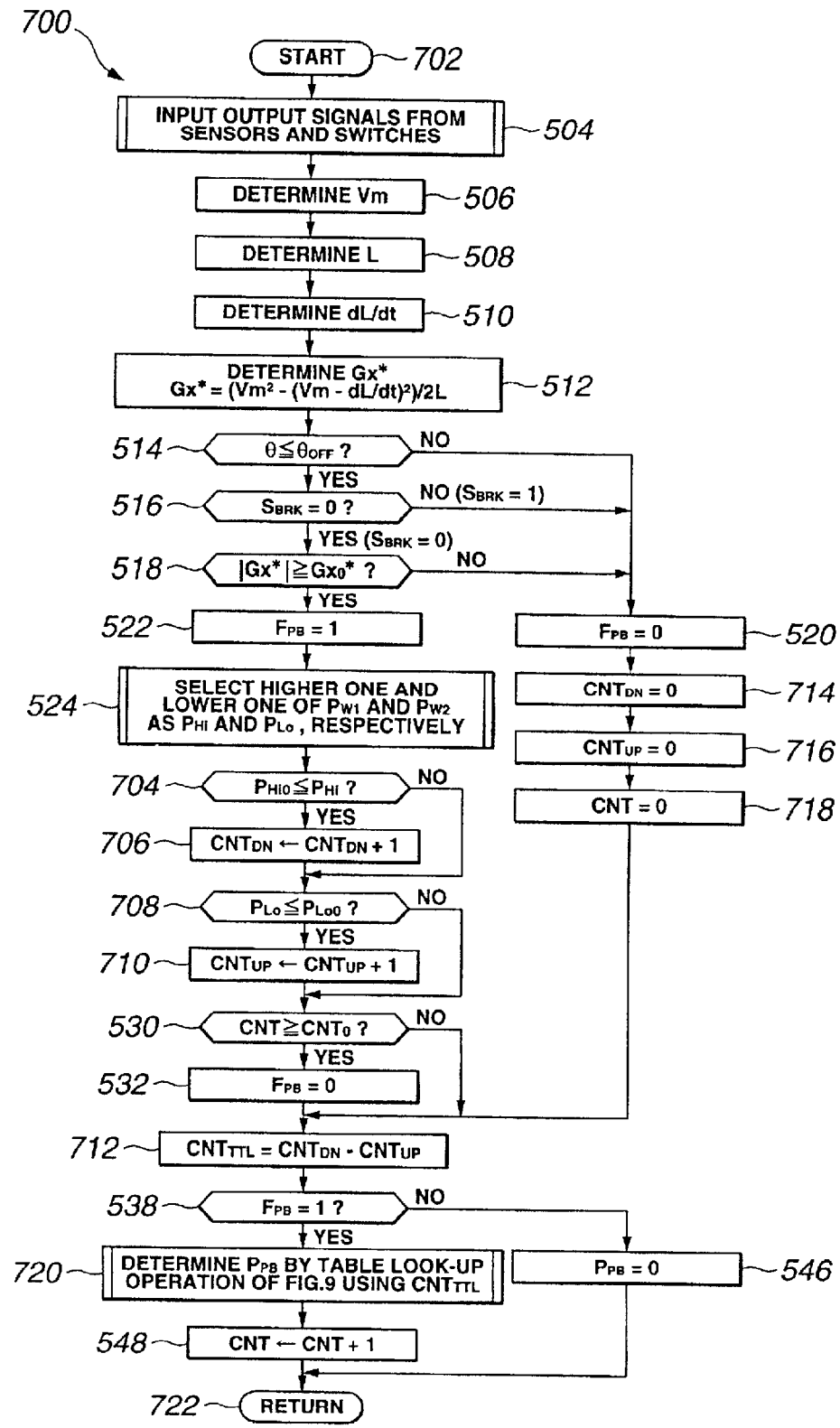
FIG. 8 is a flowchart illustrating a series of operations of a control routine for carrying out further preferred embodiment of the present invention.

FIG. 8 illustrates a series of operations for carrying out the third preferred embodiment of the present invention. In FIG. 8, a control routine is generally indicated at 700. The process steps of control routine 700 are carried out every 10 milliseconds in controller 46 as provided through a standard computer timer-based interrupt process.

Each sequential execution of the microprocessor operations of FIG. 8 begins at start block 702 and proceeds to block 504. Control routine 700 of FIG. 8 is substantially the same as control routine 500 of FIG. 6 except the provision of blocks 704, 706, 708, and 710 instead of the blocks 526 and 528, and the provision of block 712 instead of the block 536, and the provision of block 720 instead of the block 544, and the provision of blocks 714, 716, and 718 instead of the blocks 540 and 542. Thus like reference numerals are used throughout FIGS. 6 and 8 to indicate like blocks.

In the third embodiment, at block 524, the processor selects a higher one of first and second output signals $P_{W1}$ and $P_{W2}$ to determine a first or higher value $P_{Hi}$ of the variable, and selects a lower one of them to determine a second or lower value $P_{Lo}$ of the variable. The process goes to block 704. At block 704, the processor compares higher value $P_{Hi}$ with threshold $P_{HiO}$ (=0.3 MPa, in the embodiment). In query at block 704, if $P_{Hi}$ is greater than or equal to $P_{HiO}$ (answer "YES"), the process goes to block 706. In query at block 704, if $P_{Hi}$ is less than $P_{HiO}$ (answer "NO"), the process skips to block 708. At block 706, the processor performs increment of a down-counter $CNT_{DN}$ by increasing content of counter $CNT_{DN}$ by 1 (one). Next, the process goes to block 708.

At block 708, the processor compares lower value $P_{Lo}$ with threshold $P_{LoO}$ (=0.01 MPa). In query at block 708, if $P_{Lo}$ is less than or equal to $P_{LoO}$ (answer "YES"), the process goes to block 710. In query at block 708, if $P_{Lo}$ is greater than $P_{LoO}$ (answer "NO"), the process skips to block 530. At block 710, the processor performs increment of an up-counter $CNT_{up}$ by increasing content of counter $CNT_{up}$ by 1 (one). Next, the process goes to block 530.

After microprocessor processing at blocks 530 and 532, the process goes to block 712. At block 712, the processor calculates content of a total counter $CNT_{TTL}$ by subtracting the content of up-counter $CNT_{up}$ from the content of down-counter $CNT_{DN}$.

The process then goes to block 538. After block 520, the processor resets counters $CNT_{DN}$, $CNT_{up}$, and CNT at blocks 714, 716, and 718, respectively. Then, the process goes to block 712. At block 712, content of total counter $CNT_{TTL}$ becomes zero. Then, the process goes to block 538.

At block 538, flag $F_{PB}$ is checked. In query at block 538, if flag $F_{PB}$ is set (answer "YES"), indicating that operator braking action is imminent, the process goes to block 720. In query at block 538, if flag $F_{PB}$ is reset (answer "NO"), the process goes to block 546. At block 720, the processor refers to the fully drawn line 420 in FIG. 9 using $CNT_{TTL}$ by table look-up or arithmetic operation, for example, to find an appropriate brake pressure value to be set as brake signal $P_{PB}$. The process goes to next block 548. At block 548, the processor performs an increment of counter CNT by increasing content of counter CNT by 1 (one). Next, the process goes to return block 722. At block 546, brake signal $P_{PB}$ is set to correspond to zero pressure value. The process skips to return block 722.

According to the third embodiment, the content of total counter $CNT_{TTL}$ determines an appropriate brake pressure value, which brake signal $P_{PB}$ corresponds to, as illustrated by the fully drawn line 420 in FIG. 9. As illustrated, within a window limited by $-CNT_{TTLO}$ and by $CNT_{TTLO}$, the greater the content of total counter $CNT_{TTL}$, the less brake signal $P_{PB}$ is. In the event, content of total counter $CNT_{TTL}$ is positive and not greater than $CNT_{TTLO}$, the greater the content of counter $CNT_{TTL}$, the less brake signal $P_{PB}$ is. In the event content of total counter $CNT_{TTL}$ is negative, the less the content of counter $CNT_{TTL}$, the greater brake signal $P_{PB}$ is.

In each of the first to third embodiments, microprocessor processing to increase the content of counter, such as $CNT_{Hi}$, $CNT_{Lo}$, $CNT_{DN}$, and $CNT_{UP}$, is nothing but counting a period of time during which the associated variable, such as $P_{Hi}$ and $P_{Lo}$, exceeds its associated threshold.

Figure 10:
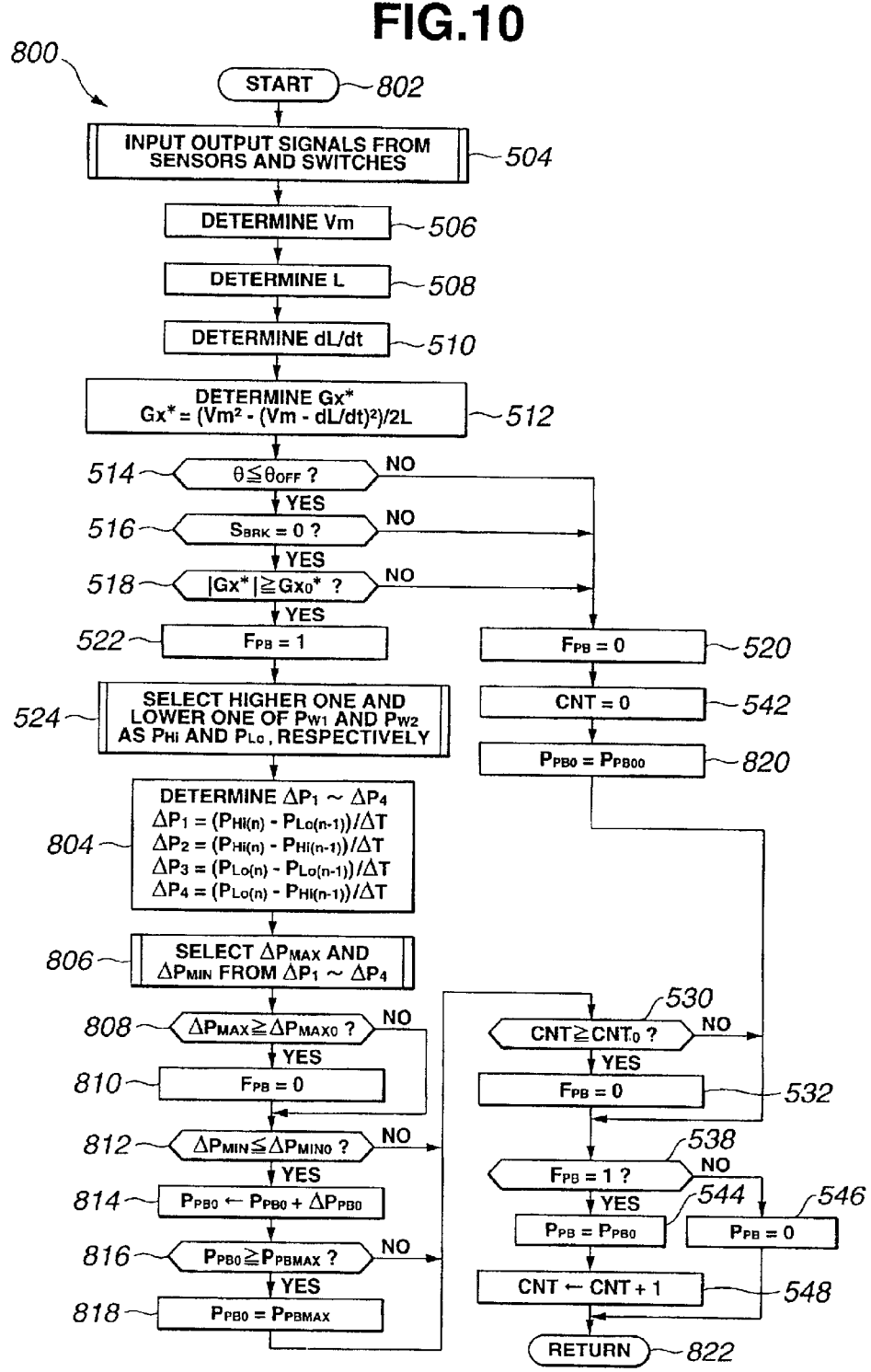
FIG. 10 is a flowchart illustrating a series of operations of a control routine for carrying out still further preferred embodiment of the present invention.

FIG. 10 illustrates a series of operations for carrying out the fourth preferred embodiment of the present invention. In FIG. 10, a control routine is generally indicated at 800. The process steps of control routine 800 are carried out every 10 milliseconds in controller 46 as provided through a standard computer timer-based interrupt process.

Each sequential execution of the microprocessor operations of FIG. 10 begins at start block 802 and proceeds to block 504. Control routine 800 of FIG. 10 is substantially the same as control routine 500 of FIG. 6 except the provision of blocks 804, 806, 808, 810, 812, 814, 816 and 818 instead of the blocks 526, 528, 534, and 536, and the provision of block 820 instead of the block 540. Thus like reference numerals are used throughout FIGS. 6 and 10 to indicate like blocks.

In the fourth embodiment, at block 524, the processor samples the first (or higher) and second (or lower) values ($P_{Hi}$, $P_{Lo}$) of the variable, which are determined in a current processor operating cycle, as current sampled first and second values ($P_{Hi(n)}$, $P_{Lo(n)}$), respectively. The processor samples the previously determined first and second values of the variable, which were determined in the preceding operating cycle, as old sampled first and second values ($P_{Hi(n-1)}$, $P_{Lo(n-1)}$), respectively.

At the next block 804, the processor calculates a first time rate of change $\Delta P_1$, which is expressed as a ratio, ($P_{Hi(n)} - P_{Lo(n-1)}$)/$\Delta T$, a second time rate of change $\Delta P_2$, which is expressed as a ratio, ($P_{Hi(n)} - P_{Hi(n-1)}$)/$\Delta T$ a third time rate of change $\Delta P_3$, which is expressed as a ratio, ($P_{Lo(n)} - P_{Lo(n-1)}$)/$\Delta T$ and a fourth time rate of change $\Delta P_4$, which is expressed as a ratio, ($P_{Lo(n)} - P_{Hi(n-1)}$)/$\Delta T$. The process goes to block 806.

At block 806, the processor selects the maximum value $\Delta P_{MAX}$ and the minimum value $\Delta P_{MAX}$ among the first, second, third, and fourth time rates of change $\Delta P_1$, $\Delta P_2$, $\Delta P_3$, and $\Delta P_4$. The process goes next to block 808.

According to the fourth embodiment, two brake torque thresholds, namely, a first brake torque threshold $\Delta P_{MAXO}$ and a second brake torque threshold $\Delta P_{MINO}$ are provided. In this embodiment, the first threshold $\Delta P_{MAXO}$ indicates a time rate of change in brake pressure as great as the maximum of various time rates of change in brake pressure available during operator operation of a brake pedal in normal braking. The second threshold $\Delta P_{MINO}$ indicates a time rate of change in brake pressure as great as a time rate of change in brake pressure, below which the intended performance of the system drops considerably. At block 808, the processor compares $\Delta P_{MAX}$ with $\Delta P_{MAXO}$. In query at block 808, if $\Delta P_{MAX}$ is greater than or equal to $\Delta P_{MAXO}$ (answer "YES"), the process goes to block 810. In query at block 808, if $\Delta P_{MAX}$ is less than $\Delta P_{MAXO}$ (answer "NO"), the process skips to block 812. At block 810, the processor resets flag $F_{PB}$. The process then goes to block 812.

At block 812, the processor compares $\Delta P_{MIN}$ with $\Delta P_{MINO}$. In query at block 812, if $\Delta P_{MIN}$ is less than or equal to $\Delta P_{MINO}$ (answer "YES"), the process goes to block 814. In query at block 812, if $\Delta P_{MIN}$ is greater than $\Delta P_{MINO}$ (answer "NO"), the process skips to block 530. At block 814, the processor resets flag $F_{PB}$. The process then goes to block 814. At block 814, the processor performs an increment of brake pressure value $P_{PB0}$ by increasing $P_{PB0}$ by a predetermined amount $\Delta P_{PB0}$. Next, the process goes to block 816. At block 816, the processor compares $P_{PB0}$ with a predetermined maximum value $P_{PBMAX}$. In the embodiment, the predetermined maximum value $P_{PBMAX}$ indicates a brake pressure value as high as 0.2 MPa. In query at block 816, if $P_{PB0}$ is greater than or equal to $P_{PBMAX}$ (answer "YES"), the process goes to block 818. In query at block 816, if $P_{PB0}$ is less than $P_{PBMAX}$ (answer "NO"), the process skips to block 530. At block 818, the processor sets $P_{PBMAX}$ as $P_{PB0}$. Then, the process goes to block 530.

After processing at blocks 520 and 542, the processor sets an initial value $P_{PB00}$ as $P_{PB}$ at block 820. The processor goes from block 820 to block 538.

At block 530, the content of a stand-by braking manager counter CNT is compared with a predetermined time threshold $CNT_O$. The time threshold $CNT_0$ is a predetermined number of one hundred (100) to represent a period of time of one second, that is 1000 milliseconds, because one cycle time $\Delta T$ is 10 milliseconds. In query at block 530, if the content of counter CNT is greater than or equal to time threshold $CNT_0$ (answer "YES"), the process goes to block 532. In query at block 530, if CNT is less than $CNT_0$ (answer "NO"), the process skips to block 538. At block 532, the processor resets flag FPB. The process goes next to block 538.

At block 538, the flag $F_{PB}$ is checked. In query at block 538, if flag $F_{PB}$ is set, indicating that operator braking action is imminent, the process goes to block 544. In query at block 538, if flag $F_{PB}$ is reset, the process goes to block 546. At block 544, the processor sets brake signal PPB to correspond to the value $P_{PB0}$. The process goes to next block 548. At block 548, the processor performs an increment of counter CNT by increasing content of counter CNT by 1 (one). The process goes to return block 822. At block 546, the processor sets brake signal PPB to correspond to zero pressure value. The processor skips to return block 822.

From the preceding description, it is now appreciated that, according to the fourth embodiment, the maximum and minimum values ($\Delta P_{MAX}$, $\Delta P_{MIN}$) have been selected among the first, second, third, and fourth time rates of change ($\Delta P_1$, $\Delta P_2$, $\Delta P_3$, $\Delta P_4$) to cope with possible errors in sensor output signals ($P_{W1}$, $P_{W2}$).

In the embodiments of this invention, application of brake torque as a stand-by braking torque is terminated upon operator depression of brake pedal (see blocks 516 and 520). If desired, this application of brake torque may continue even after operator has depressed brake pedal.

In the embodiments of this invention, brake booster is utilized to regulate hydraulic brake pressure to accomplish a target value of brake torque. This invention is not limited to this. If desired, a system hydraulic fluid pressure discharged by a pump may be regulated to provide brake pressure for the target value of brake torque.

In the embodiments of this invention, a master cylinder is operated to produce brake pressure for application of brake torque. This invention is not limited to this. If a powering system employs a traction motor/generator as a power source, a desired brake torque for stand-by braking may be applied by regulating current passing through the motor.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2000-263975, filed Aug. 31, 2000, the disclosure of which is hereby incorporated by reference in its entirety.

What is claimed is:

1. A method for controlling a stand-by braking torque applied to an automotive vehicle under a condition of approaching or following an obstacle preceding the vehicle, the method comprising:

determining a brake signal for brake pressure to apply a brake torque, as a stand-by braking torque;

establishing at least one brake torque threshold;

monitoring the brake torque;

comparing the monitored brake torque with the established brake torque threshold; and modifying the brake signal in response to the comparing the monitored brake torque with the established brake torque threshold.

2. A method as claimed in claim 1, wherein a braking system is employed, which uses hydraulic brake fluid as working medium, wherein the step of monitoring the brake torque includes:

detecting pressure of the hydraulic brake fluid at a first location within the braking system to generate a first output signal indicative of the detected pressure at the first location;

detecting pressure of the hydraulic brake fluid at a second location within the braking system to generate a second output signal indicative of the detected pressure at the second location; and processing the first and second output signals to provide at least one variable expressing one of characteristics of the brake torque.

3. A system for controlling a stand-by braking torque applied to an automotive vehicle under a condition of approaching or following an obstacle preceding the vehicle, the system comprising:

an obstacle detection system for detecting a distance between the vehicle and the obstacle preceding the vehicle;

a braking system for application, as a stand-by braking torque, brake torque to the vehicle in response to a brake signal; and a controller for determining whether or not an operator braking action to reduce the speed of the vehicle is imminent under a condition of approaching or following an obstacle preceding the vehicle based on the detected distance by the detection system and a vehicle speed of the vehicle, determining an initial value of brake torque, determining the brake signal for the determined initial value of brake torque, applying the determined brake signal to the braking system upon determination that the operator braking action is imminent, monitoring the brake torque applied to the vehicle, and modifying the brake signal based on the monitored brake torque after determination that the operator braking action is imminent.

4. A system as claimed in claim 3, wherein the controller determines a variable expressing instantaneous magnitude of the brake torque, compares the determined variable with a predetermined brake torque threshold, and effects operations to modify the brake signal when the determined variable satisfies a predetermined relationship with the predetermined brake torque threshold.

5. A system as claimed in claim 4, wherein the controller calculates a period of time during which the determined variable stays greater than or equal to the predetermined brake torque threshold, and reduces the brake signal to lower the brake torque when the calculated period of time is equal to or greater than a predetermined period of time.

6. A system as claimed in claim 4, wherein the controller calculates a period of time during which the determined variable stays greater than or equal to the predetermined brake torque threshold, and adjusts the brake signal to reduce the brake torque in response to the calculated period of time.

7. A system as claimed in claim 3, wherein the controller determines a variable expressing instantaneous magnitude of the brake torque, compares the determined variable with a predetermined brake torque threshold, and effects operations to modify the brake signal when the determined variable satisfies a predetermined relationship with the predetermined brake torque threshold.

8. A system as claimed in claim 7, wherein the controller calculates period of time during which the determined variable stays less than or equal to the predetermined brake torque threshold, and increases the brake signal to increase the brake torque when the calculated period of time is equal to or greater than a predetermined period of time.

9. A system as claimed in claim 7, wherein the controller calculates period of time during which the determined variable stays less than or equal to the predetermined brake torque threshold, and adjusts the brake signal to increase the brake torque in response to the calculated period of time.

10. A system as claimed in claim 3, wherein the controller determines a variable expressing time rate of change of magnitude of the brake torque, compares the determined variable with a predetermined brake torque threshold, and reduces the brake signal to reduce the brake torque when the determined variable is greater than or equal to the predetermined brake torque threshold.

11. A system as claimed in claim 3, wherein the controller determines a variable expressing time rate of change of magnitude of the brake torque, compares the determined variable with a predetermined brake torque threshold, and increases the brake signal to increase the brake torque when the determined variable is less than or equal to the predetermined brake torque threshold.

12. A system as claimed in claim 3, wherein the controller determines a first variable expressing instantaneous magnitude of the brake torque, compares the determined first variable with a predetermined first brake torque threshold, and calculates a first period of time during which the determined first variable stays greater than or equal to the first predetermined brake torque threshold;

wherein the controller determines a second variable expressing instantaneous magnitude of the brake torque, compares the determined second variable with a predetermined second brake torque threshold, and calculates a second period of time during which the determined second variable stays less than or equal to the predetermined second brake torque threshold; and wherein the controller subtracts the calculated second period of time from the calculated first period of time to give a difference, and adjusts the brake signal in response to the difference.

13. A system as claimed in claim 6, wherein the controller adjusts the brake signal such that the longer the calculated period of time, the less the brake torque is.

14. A system as claimed in claim 9, wherein the controller adjusts the brake signal such that the longer the calculated period of time, the greater the brake torque is.

15. A system as claimed in claim 12, wherein the controller adjusts the brake signal such that, in the event the difference is positive, the greater the difference, the less the brake torque is, while, in the event the difference is negative, the less the difference, the greater the brake torque is.

16. A system as claimed in claim 13, wherein the braking system employs hydraulic brake fluid as working medium, and a first pressure sensor detects first pressure of the hydraulic brake fluid of the braking system to generate a first output signal indicative of the detected first pressure, and a second pressure sensor detects second pressure of the hydraulic brake fluid of the braking system to generate a second output signal.

17. A system as claimed in claim 16, wherein the controller determines a maximum and a minimum of the first and second output signals and uses one of the determined maximum and minimum as a variable expressing instantaneous magnitude of the brake torque.

18. A method for controlling a stand-by braking torque applied to an automotive vehicle under a condition of approaching or following an obstacle preceding the vehicle, the automotive vehicle having a braking system for application of brake torque, as a stand-by braking torque, to the vehicle in response to a brake signal, the method comprising:

detecting a distance between the vehicle and the obstacle preceding the vehicle;

determining whether or not an operator braking action to reduce the speed of the vehicle is imminent under a condition of approaching or following an obstacle preceding the vehicle based on the detected distance by the detection system and a vehicle speed of the vehicle;

determining an initial value of brake torque;

determining the brake signal for the determined initial value of brake torque;

applying the determined brake signal to the braking system upon determination that the operator braking action is imminent;

monitoring the brake torque applied to the vehicle; and modifying the brake signal based on the monitored brake torque after determination that the operator braking action is imminent.

19. A system for controlling a stand-by braking torque applied to an automotive vehicle under a condition of approaching or following an obstacle preceding the vehicle, comprising:

means for applying brake torque, as a stand-by braking torque, to the vehicle in response to a brake signal;

means for detecting a distance between the vehicle and the obstacle preceding the vehicle;

controller means for determining whether or not an operator braking action to reduce the speed of the vehicle is imminent under a condition of approaching or following an obstacle preceding the vehicle based on the detected distance by the detection system and a vehicle speed of the vehicle, determining an initial value of brake torque, determining the brake signal for the determined initial value of brake torque, applying the determined brake signal to the braking system upon determination that the operator braking action is imminent, monitoring the brake torque applied to the vehicle, and modifying the brake signal based on the monitored brake torque after determination that the operator braking action is imminent.

20. An automotive vehicle comprising:

a detection system for detecting a distance between the vehicle and the obstacle preceding the vehicle;

a braking system for application of brake torque, as a stand-by braking torque, to the vehicle in response to a brake signal; and a controller for determining whether or not an operator braking action to reduce the speed of the vehicle is imminent under a condition of approaching or following an obstacle preceding the vehicle based on the detected distance by the detection system and a vehicle speed of the vehicle, determining an initial value of brake torque, determining the brake signal for the determined initial value of brake torque, applying the determined brake signal to the braking system upon determination that the operator braking action is imminent, monitoring the brake torque applied to the vehicle, and modifying the brake signal based on the monitored brake torque after determination that the operator braking action is imminent.

* * * * *